United States Patent [19]

Mohwinkel

[11] E Re. 29,137

[45] Reissued Feb. 15, 1977

[54] PROCESS OF PRESERVING POTATOES IN CLOSED PACKAGES

[75] Inventor: Franz Mohwinkel, Ahlften uber Soltau, Germany

[73] Assignee: Washington Nu Process, Inc., Quincy, Wash.

[22] Filed: Feb. 14, 1974

[21] Appl. No.: 442,622

Related U.S. Patent Documents

Reissue of:

[64] Patent No.: 3,658,559
Issued: Apr. 25, 1972
Appl. No.: 878,413
Filed: Nov. 20, 1969

U.S. Applications:

[63] Continuation-in-part of Ser. No. 804,694, March 5, 1969, abandoned.

[30] Foreign Application Priority Data

| | | |
|---|---|---|
| June 28, 1969 | Germany | 1932900 |
| Mar. 9, 1968 | Germany | 1692048 |
| Aug. 21, 1968 | Germany | 1792332 |

[52] U.S. Cl. ..... 426/412; 426/521; 426/523

[51] Int. Cl.[2] ..... A23B 7/00

[58] Field of Search ..... 426/316, 324–326, 426/410, 412, 418, 419, 521, 523, 615, 637, 401, 404, 407, 408

[56] References Cited

UNITED STATES PATENTS

| | | | |
|---|---|---|---|
| 2,231,791 | 2/1941 | Bensel | 426/411 |
| 2,597,067 | 5/1952 | Chase | 426/509 |
| 2,609,301 | 9/1952 | Lindsey | 426/105 |
| 3,102,034 | 8/1963 | Weinberg | 53/12 |
| 3,175,914 | 3/1965 | Vahlsing, Jr. | 426/262 |
| 3,190,759 | 6/1965 | Stryk | 426/412 |
| 3,215,539 | 11/1965 | Landy | 426/234 |
| 3,261,140 | 7/1966 | Long | 53/22 |
| 3,355,304 | 10/1967 | Barnes | 426/464 |
| 3,501,318 | 3/1970 | Wilson | 426/412 |
| 3,511,169 | 5/1970 | Fritzberg | 99/370 |
| 3,531,300 | 9/1970 | Greenberg | 426/232 |
| 3,552,982 | 1/1971 | Savidge | 426/412 |

FOREIGN PATENTS OR APPLICATIONS

| | | |
|---|---|---|
| 579,098 | 7/1959 | Canada |
| 1,132,785 | 7/1962 | Germany |
| 816,313 | 7/1959 | United Kingdom |

OTHER PUBLICATIONS

AVI Publication, Potato Processing, Dec. 5, 1968, p. 588.
National Potato U. Conference, May 1962, p. 32.

*Primary Examiner*—Norman Yudkoff
*Assistant Examiner*—Martin G Mullen
*Attorney, Agent, or Firm*—Cushman, Darby & Cushman

[57] ABSTRACT

A process for preserving foodstuffs such as potatoes in closed packages of foil packing material wherein the peeled, raw and if required sliced or diced potatoes are vacuum-packed without any included liquid and cooked or steamed and then cooled at a external pressure exceeding the internal pressure in the packing and controlled independently of the temperature, and wherein during the vacuum-packing process each potato or piece of potato is brought into direct contact with the inside of the packing material through at least a part of its surface area, preferably a third.

6 Claims, 11 Drawing Figures

INVENTOR
FRANZ MOHWINKEL
BY
Young & Thompson
ATTYS.

INVENTOR
FRANZ MOHWINKEL
BY
Young & Thompson
ATTYS

INVENTOR
FRANZ MOHWINKEL
BY
Young & Thompson
ATTYS.

PROCESS OF PRESERVING POTATOES IN CLOSED PACKAGES

Matter enclosed in heavy brackets [ ] appears in the original patent but forms no part of this reissue specification; matter printed in italics indicates the additions made by reissue.

This is a continuation-in-part of my co-pending application, Ser. No. 804,694, filed Mar. 5, 1969.

The present invention relates to the art of preserving and sterilizing foods and, more particularly, to a novel process for preserving foodstuffs such as potatoes in closed packages using pressure cookers (autoclaves) or cooking receptacles, and to the packaged goods thus preserved.

In the known processes of preserving potatoes by canning or bottling them in water a product is obtained which can be preserved for a relatively long period but which, as a result of being stored in a preserving liquid, deteriorates in flavor and loses valuable nutrient substances which are leached out by the liquid. Moreover, canning and, in particular, bottling are expensive and inconvenient and, when buying, the customer cannot see the product in the can, which is a possible disadvantage.

The object of this invention is to remove the present disadvantages and to provide an improved process of producing preserved potatoes which hardly differ in taste from fresh boiled potatoes and which, even in the wrapped state, afford an attractive appearance.

A further object of this invention is to provide a process of producing well preserved potatoes which are readily usable without further cooking, but only warming up.

Yet another object of this invention is to provide a process of producing a product which keeps for a relatively long period of time and which is neither leached out nor deteriorated in appearance and particularly color and taste compared to the natural product.

A further object of this invention is to produce a potato-product which is available to the user in packages, the quality of which he or she can judge by eye.

Further and other objects and advantages of the invention will be apparent from the following detailed description thereof.

In my process for cooking or steaming potatoes in closed packages with the aid of cooking autoclaves or cooking receptacles, peeled raw potatoes are vacuum-packed in plastics containers with the treating temperature of about + 100° C. or somewhat higher, while the absolute pressure in the cooking autoclaves or cooking receptacles is kept considerably higher than the absolute internal pressure of the container by supplying the latter, during the preserving treatment with steam, with so much compressed air that, at a temperature of about + 100° C., the total pressure in the steam space considerably exceeds the corresponding partial pressure of the steam of 1 atms., or the total pressure in the cooking receptacle considerably exceeds the steam pressure corresponding to this temperature. With this process, the potatoes are vacuum-packed in plastic-foil containers without any addition of liquid and are cooked and cooled under an external pressure exceeding the internal pressure of the closed containers and controlled independently of the temperature.

It is an essential feature of this process that at least one part of the surface of each potato or each piece of potato is brought into direct contact with the inside of the packing foil during the vacuum-packing process step.

If potatoes vacuum-packed in packages of foil material without any liquid undergo the cooking process in autoclaves or cooking receptacles, the danger arises that if the cooking temperature is relatively high, about + 120° C., or if during the cooking process, for one reason or another, it unintentionally increases and the packaged potatoes are exposed for a longer time to a temperature of this value, incrustation and discoloration of the surface of the potatoes or pieces of potato occurs. This leads to a considerable reduction in the quality of the product.

On the other hand, for practical reasons, it is desired to use temperatures of this level for cooking the potatoes since these temperatures are usually used in the common canning and bottling preserving methods wherein the potatoes are treated with liquid, and furthermore, the internationally accepted standard for the sterilisation effect is based on a cooking temperature of 121° C.

I have found that with the new process in which the potatoes are treated without liquid, these high temperatures can be used provided that the form of the packing bears a certain relation to the form of the articles of produce to be packed, namely so that during the filling and vacuum-sealing processes, one point of the surface of each individual article of produce comes into direct contact with the packing material and is fixed in this position for the subsequent stages of treatment. In this manner, with the process according to the invention, cooking can be undertaken at any of the usual cooking temperatures. As with the known processes, for each individual case the optimum conditions during the cooking stage are practically determined from the relation: cooking temperature × cooking time. In the temperature region in question, from about 100°–125° C. and in the respective range of the cooking period of from about 20 minutes up to 2 hours, the height of temperature level and the length of period of time are in reciprocal relationship, i.e., under generally uniform conditions, practically uniform results are obtained if cooking is undertaken for about 2 hours at 100° C. or about 25 minutes at 121° C.

With the method according to the invention, the external pressure surrounding the filled packages is controlled and thus adjusted independently of the temperature during the cooking process and the subsequent cooling, so that it considerably exceeds the internal pressure in the package containers. By way of example, with a cooking temperature of 121° C., at which the internal pressure in the packages corresponds approximately to the steam pressure of the water present in the packed potatoes, thus at about 1 atmospheric excess pressure, the external pressure is set at one atmosphere higher, namely at about 3 atms. absolute pressure.

The arrangement according to the invention, of bringing each individual piece of the produce to be treated into direct contact with the wall of the packing material, seems surprising at first, for usually a direct contact is allowed only when it is consciously desired to brown the external surface of the pieces of potatoes, e.g., during the preparation of roast potatoes. However according to the invention, this step has the reverse effect of avoiding browning or other chemical change at any points of the surface of the pieces of produce to be treated.

Having carried out thorough investigations, I am able to theoretically explain the surprising effect which is reached with the previously described technical steps of the process according to the invention, as follows:

When cooking or sterilising vacuum-packed potatoes or pieces of potatoes which are packed in foil material without any liquid, completely different conditions are valid for the conduction of heat and heat transfer compared to the preserving of potatoes with liquid in cans or bottles. With the known method of preserving, the cans and bottles filled with the potatoes and liquid and then closed are heated from the outside and the heat transfer within the containers takes place through the transition of heat via the wall of the container heated by the external heating medium and the liquid, generally water, to the produce enclosed in the can or bottle which is to be heated. Since the liquid material, such as water, is a good conductor of heat, after a relatively short period of heating, the heat is equally and thoroughly distributed in the inner space of the packing container. It is known that this transfer of heat can be speeded up by moving or tumbling the cans during heating.

If on the other hand, potatoes are vacuum-packed in packaging containers without any liquid, such a type of heat transfer cannot take place. Though even then the wall of the packing material is brought to the desired temperature owing to its direct contact with the external heating medium, however, since transmitting medium is missing the inner space of the vacuum-packing, the heat can only be transferred from the wall of the packing material directly on to individual pieces of produce at those parts where the packing material is in direct contact with the packed produce. Heating of the entire inner space of the package or distribution of the heat supplied from the outside is in this case only possible by way of the packed potatoes and only at those parts where the pieces of produce are in contact. This and the fact that potato itself is a poor conductor of heat compared to water impedes the uniform heat conduction and can lead to localization of heating. It must be added here that the potatoes, particularly the uncut or comparatively large pieces, are extremely sensitive and in the case of a high or particularly lengthy heating caramelization or burning occurs, as a result of such a localisation of heat. It is therefore practically impossible without this reduction in quality to maintain heating until the heat from the layers of the packed produce in direct contact with the packing foil has passed to the produce located furthest from the packing material towards the center of the packing and the balance of heat has been adjusted. The outermost potatoes would burn or, if this were prevented, the innermost potatoes would be insufficiently sterilized.

These problems could be removed with the measures according to the invention. It is thus unnecessary to transfer heat from one potato or piece of potato to another; each individual piece of the produce is immediately supplied with heat from the outer heating medium through the direct contact between the piece and the packaging material.

The invention will now be explained with reference to the accompanying drawings which illustrate an embodiment of the packaging according to the invention and, for comparison, a known type of packaging.

In the drawing.

In all drawings, comparable parts are provided with the same reference numerals.

Figure 1:
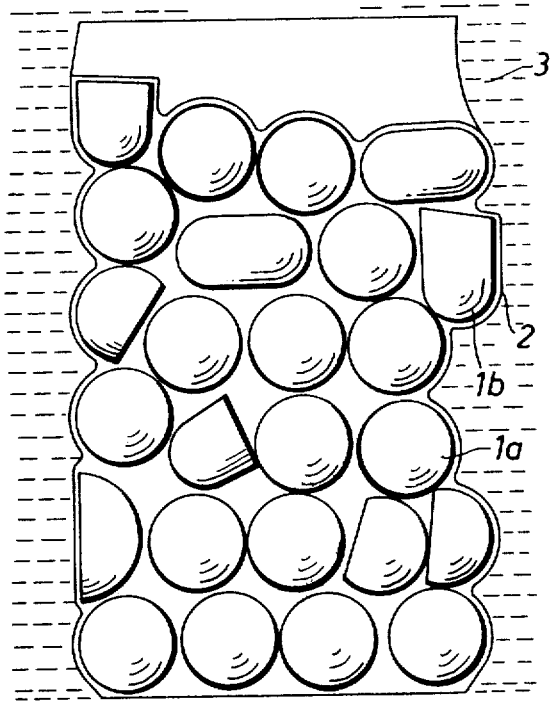
FIG. 1 is a side view of a package corresponding to the process according to the invention.

FIGS. 1 to 4 illustrate the most favourable form of package according to the invention. Each potato 1a or piece of potato 1b is in direct contact with the packing material 2 which is surrounded by the external heating medium 3, consisting of steam or water. As is clearly seen in FIG. 2, the majority of the individual potatoes or pieces, if they are diced, have two side faces directly on the packing material so that in cross-section about a third of the surface of the packed produce 1a and 1b is able to absorb the heat supplied by way of the heating medium 3 and the packing foil 2. As illustrated by the arrows in FIGS. 2, 3 and 4, this heat only needs to cover a relatively short path in order to reach the parts furthest away from the outer edge of the package, namely the core 4 of the packed produce, which enables a uniformly favourable heating to occur in a reasonable time, whilst also taking into account the relatively poor conduction of heat of the potatoes.

Figure 5:
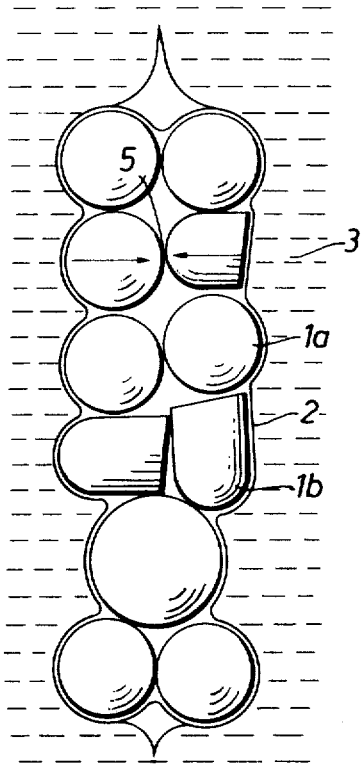
FIG. 5 is a cross-sectional view of a modified embodiment of the type of package used with the process according to the invention.
Figure 6:
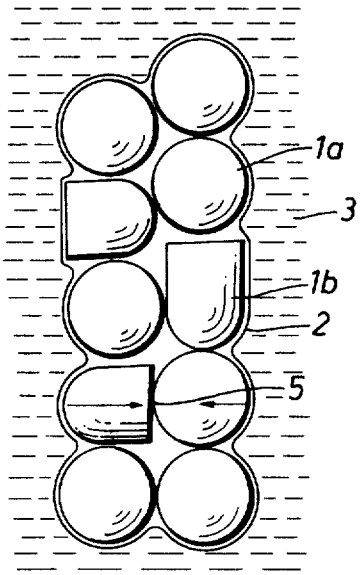
FIG. 6 is a plan view of the embodiment of FIG. 5.

A sufficiently uniform supply of heat which can be reached in a reasonable time is, as has been found, also possible with the embodiments illustrated in FIGS. 5 and 6. In the arrangement indicated, each potato 1a or piece of potato 1b is not heated from two sides but from one side, since the side faces of each piece 1a and 1b (in diced form) is in contact with the packing foil 2 which is surrounded by the heating medium 3. The path which must be covered by the heat supplied from the heating medium 3 via the packing foil 2 in order to reach the core 5 which is here located between the individual pieces of produce adjoining the packing foil on each side is about twice as long as with the embodiment in FIGS. 1 to 4, but as has been found, can still be achieved in suitable times so that at least with ordinary types of potatoes, this embodiment of the process according to the invention illustrated in FIGS. 5 and 6 leads to very favorable results.

Figure 7:
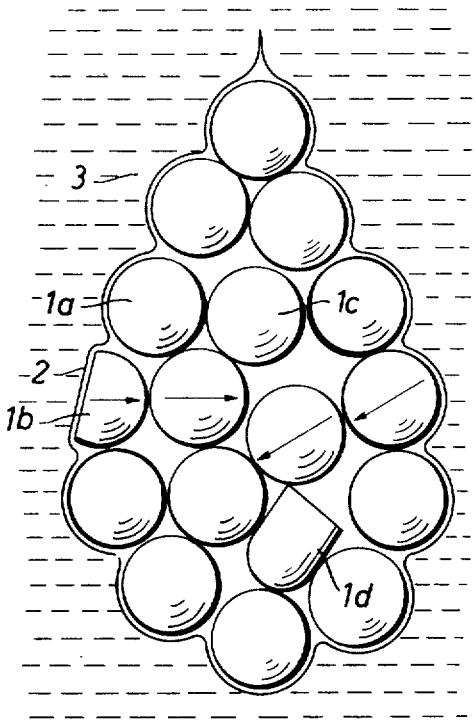
FIG. 7 is a cross-sectional view of an embodiment used for comparison.
Figure 8:
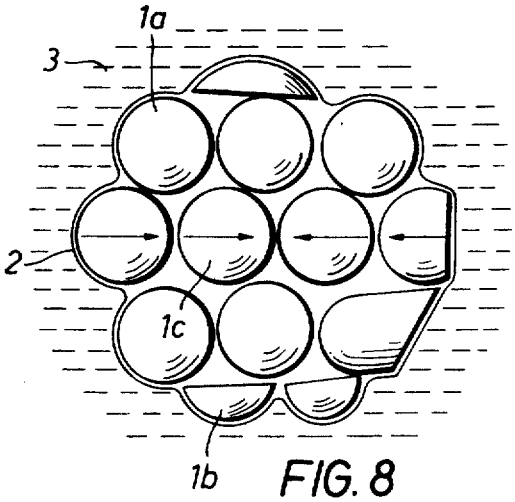
FIG. 8 is a plan view of the embodiment according to FIG. 7.
Figure 9:
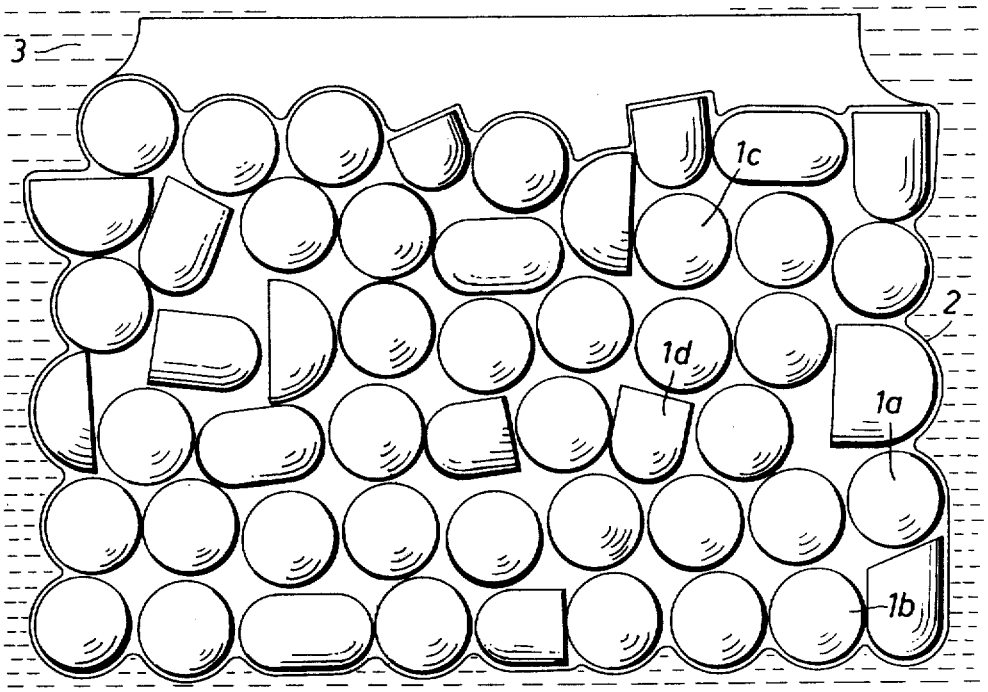
FIG. 9 is a side view of another form of comparison.
Figure 10:
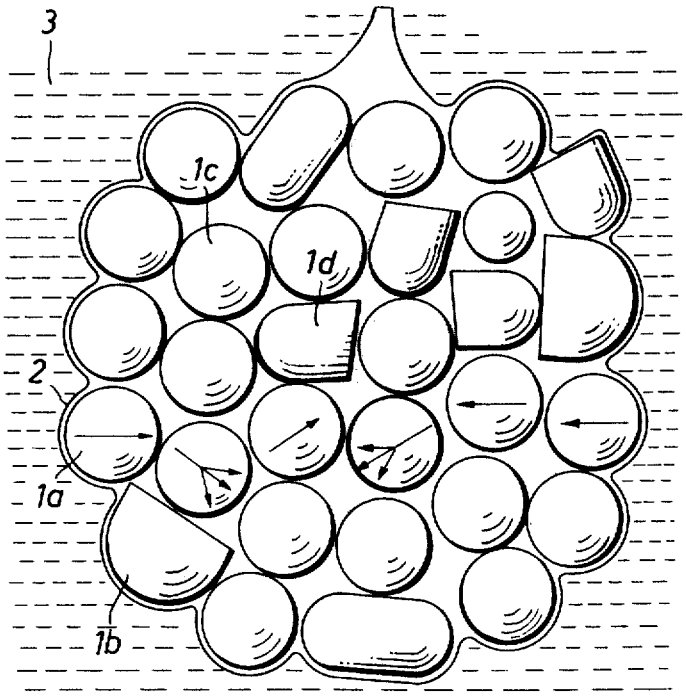
FIG. 10 is a cross-sectional view of the embodiment according to FIG. 9.

FIGS. 7 and 8 illustrate containers which have such a poor conduction of heat that a suitable sterilization of the inner potatoes 1c or pieces of potatoes 1d is not possible without a severe decrease in quality. As indicated by the arrows, the heat transferred from the heating medium 3 to the packing foil 2, and from there to the potatoes 1a or pieces of potato 1b in direct contact with the packing, must flow not only through one individual piece of potato 1a or 1b, but must also pass from there to an inner potato 1c or piece of potato 1d, which is not in direct contact with the packing material and likewise diffuse through this portion. The time required for this is so long, or the supply of heat so high that the quality of the potatoes necessary for the present purpose can no longer be maintained. Even more unfavorable are the proportions in a large packing, with a capacity of about 3 kg, as is seen in FIGS. 9 and 10. The external heating medium 3 can only directly heat surfaces of the packing material 2 which are small in comparison with the entire surface of the packed potatoes and pieces of potato 1a + 1b + 1c + 1d and the heat is only directly transferred from the packing material 2 to the few potatoes 1a or pieces of potatoes 1b lying on the outer edge of the large package. The path of heat inwardly from the outside outlined by the arrow in FIG. 10 clearly shows that a sufficient sterilisation of the inner core zone is not possible without the outer lying potatoes 1a or pieces of potato 1b being severely burnt.

Figure 2:
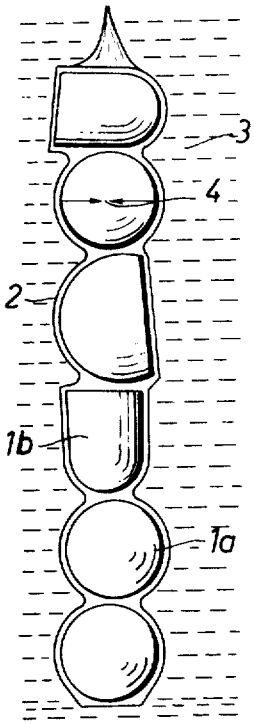
FIG. 2 is a cross-sectional view of the package according to FIG. 1.
Figure 4:
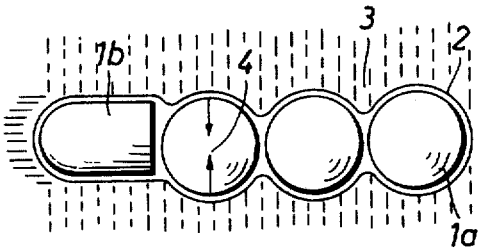
FIG. 4 is a plan view of FIG. 1.
Figure 3:
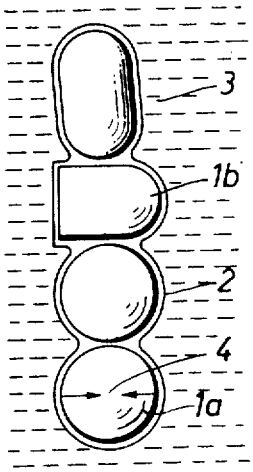
FIG. 3 is a plan view of FIG. 2.
Figure 11:
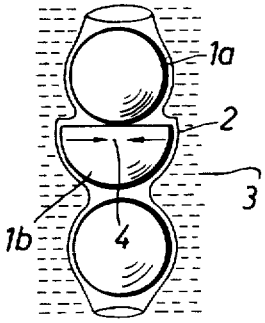
FIG. 11 is a cross-sectional view of the form of a large package in the case of the process according to the invention.

The difference between this known type of large package according to FIGS. 9 and 10 and the type which must constitute a large package when treated in accordance with the process according to the invention, can be seen at a glance by comparing FIG. 10 with FIG. 11. FIG. 11, like FIG. 2 illustrates the short path which the heat takes during the cooking process for the fully uniform heating of the packed produce for potatoes packed according to the invention.

Products preserved according to the process of my invention are able to be stored over periods as long as 6 months or more at room temperature without being in any manner perished. In fact tests have been made wherein packages of potatoes made according to this invention have been subjected to controlled temperatures and humidity conditions approximating those at the equator and for periods of as long as six months with virtually no impairment of the wholesomeness of the potatoes.

An example of materials that may be used for the plastic container 2 is a thermoplastic synthetic organic polymer such as the product commercially marketed by Messrs. Wolff Walsrode AG, Federal Republic of Germany, under the commercial designation COMBITHEN S PA 3/10 K 3060 "SIEGEL-RANDBEUTEL."

It will be appreciated that various modifications and variations in addition to those suggested above may be made in the process of the invention, and accordingly it will be understood that the invention is to be limited only within the scope of the appended claims.

Having now described this invention, what is claimed is:

1. A process for cooking and preserving potatoes in a closed and sealed package of plastic material comprising: a vacuum-packing peeled, raw and sliced or diced potatoes in said package without adding any liquid so that there is no water or other liquid in the closed and sealed package other than the natural juices within the potatoes therein, cooking and then cooling said packaged potatoes at an external pressure exceeding the internal pressure in the package, and wherein during the vacuum-packing step each piece of potato in said package is brought into direct contact with the plastic material enveloping the pieces of potatoes to be cooked and preserved.

2. The process of claim 1, wherein during the vacuum-packing process each piece of potato is brought into direct contact with the inside of the packing material through at least a third of its surface area.

3. The process of claim 1, wherein cooking by steaming is performed with a cooking temperature of about 121° C. at an internal pressure in the packings of about 3 atms. absolute pressure for a cooking period of about 25 minutes.

4. The process of claim 1, wherein cooking by steaming is performed with a cooking temperature of about 100° C. at an internal pressure in the packages of about 3 atms. absolute pressure for a cooking period of about 2 hours.

5. The process defined in claim 1 wherein the package is substantially transparent.

6. The process defined in claim 1 and further wherein the said packaged potatoes, after said cooking and cooling, are stored at room temperature without being refrigerated.

* * * * *